(12) United States Patent
Neff et al.

(10) Patent No.: US 8,335,259 B2
(45) Date of Patent: Dec. 18, 2012

(54) SYSTEM AND METHOD FOR REFORMATTING DIGITAL BROADCAST MULTIMEDIA FOR A MOBILE DEVICE

(75) Inventors: Ralph Neff, San Diego, CA (US); Giri Anantharaman, San Diego, CA (US); Krisda Lengwehasatit, Chiangmai (TH); Osama Al-Shaykh, San Diego, CA (US)

(73) Assignee: Packetvideo Corp., San Diego, CA (US)

( * ) Notice: Subject to any disclaimer, the term of this patent is extended or adjusted under 35 U.S.C. 154(b) by 716 days.

(21) Appl. No.: 12/381,052

(22) Filed: Mar. 7, 2009

(65) Prior Publication Data

US 2009/0232220 A1  Sep. 17, 2009

Related U.S. Application Data

(60) Provisional application No. 61/069,053, filed on Mar. 12, 2008.

(51) Int. Cl.
*H04N 11/02* (2006.01)

(52) U.S. Cl. .................................. 375/240.21

(58) Field of Classification Search ........................ None
See application file for complete search history.

(56) References Cited

U.S. PATENT DOCUMENTS

| | | |
|---|---|---|
| 5,790,848 A | 8/1998 | Wlaschin |
| 5,812,699 A * | 9/1998 | Zhu et al. ............... 382/232 |
| 5,862,325 A | 1/1999 | Reed et al. |
| 6,141,682 A | 10/2000 | Barker |
| 6,167,092 A | 12/2000 | Lengwehasatit |
| 6,175,856 B1 | 1/2001 | Riddle |
| 6,182,287 B1 | 1/2001 | Schneidewend et al. |
| 6,304,969 B1 | 10/2001 | Wasserman et al. |
| 6,407,680 B1 | 6/2002 | Lai et al. |
| 6,429,812 B1 | 8/2002 | Hoffberg |
| 6,498,865 B1 | 12/2002 | Brailean et al. |
| 6,529,552 B1 | 3/2003 | Tsai et al. |
| 6,647,269 B2 | 11/2003 | Hendrey et al. |
| 6,804,717 B1 | 10/2004 | Bakshi et al. |
| 6,865,600 B1 | 3/2005 | Brydon et al. |
| 6,941,324 B2 | 9/2005 | Plastina et al. |
| 7,006,631 B1 | 2/2006 | Luttrell |
| 7,013,149 B2 | 3/2006 | Vetro |
| 7,139,279 B2 | 11/2006 | Jabri et al. |

(Continued)

FOREIGN PATENT DOCUMENTS

WO  WO 2009/114111  9/2009

OTHER PUBLICATIONS

PCT Written Opinion, May 5, 2009, PacketVideo Corp.

(Continued)

*Primary Examiner* — Thai Tran
*Assistant Examiner* — Sunghyoun Park
(74) *Attorney, Agent, or Firm* — Patents+TMS, P.C.

(57) ABSTRACT

A system and a method reformat digital broadcast multimedia for a mobile device. The system and the method reformat and/or repackage audiovisual content into a format that may be rendered on the mobile device without the need for additional custom software on the mobile device. The system and the method reformat incoming mobile broadcast audiovisual content into 3GPP Progressive Download format in real time while simultaneously delivering a resulting 3GPP Progressive Download file to the mobile device for rendering.

27 Claims, 5 Drawing Sheets

U.S. PATENT DOCUMENTS

| | | | |
|---|---|---|---|
| 7,460,601 B2 * | 12/2008 | Taniguchi | 375/240.26 |
| 7,493,106 B2 | 2/2009 | Espelien | |
| 7,519,686 B2 | 4/2009 | Hong et al. | |
| 2002/0002044 A1 | 1/2002 | Naruse et al. | |
| 2002/0181495 A1 | 12/2002 | Requena et al. | |
| 2003/0048855 A1 | 3/2003 | Klaghofer et al. | |
| 2003/0061369 A1 * | 3/2003 | Aksu et al. | 709/231 |
| 2003/0067872 A1 | 4/2003 | Harrell et al. | |
| 2003/0078061 A1 | 4/2003 | Kim | |
| 2003/0093267 A1 | 5/2003 | Leichtling et al. | |
| 2003/0140343 A1 | 7/2003 | Falvo et al. | |
| 2003/0142744 A1 | 7/2003 | Wu et al. | |
| 2003/0142751 A1 | 7/2003 | Hannuksela et al. | |
| 2003/0229900 A1 | 12/2003 | Reisman | |
| 2004/0068536 A1 | 4/2004 | Demers et al. | |
| 2004/0070678 A1 | 4/2004 | Toyama et al. | |
| 2004/0077313 A1 | 4/2004 | Oba et al. | |
| 2004/0088369 A1 | 5/2004 | Yeager | |
| 2004/0116067 A1 | 6/2004 | Karaoguz et al. | |
| 2004/0158645 A1 | 8/2004 | Morinaga et al. | |
| 2004/0174817 A1 | 9/2004 | Jabri et al. | |
| 2004/0193762 A1 | 9/2004 | Leon et al. | |
| 2004/0218673 A1 | 11/2004 | Wang et al. | |
| 2005/0008030 A1 | 1/2005 | Hoffman et al. | |
| 2005/0028208 A1 | 2/2005 | Ellis et al. | |
| 2005/0047448 A1 | 3/2005 | Lee et al. | |
| 2005/0095981 A1 | 5/2005 | Benco | |
| 2005/0097595 A1 | 5/2005 | Lipsanen et al. | |
| 2005/0216472 A1 * | 9/2005 | Leon et al. | 707/10 |
| 2006/0008256 A1 | 1/2006 | Khedouri et al. | |
| 2006/0010472 A1 | 1/2006 | Godeny | |
| 2006/0013148 A1 | 1/2006 | Burman et al. | |
| 2006/0029041 A1 | 2/2006 | Jabri et al. | |
| 2006/0031883 A1 | 2/2006 | Ellis et al. | |
| 2006/0056336 A1 | 3/2006 | Dacosta | |
| 2006/0056416 A1 | 3/2006 | Yang et al. | |
| 2006/0095792 A1 | 5/2006 | Hurtado et al. | |
| 2006/0159037 A1 | 7/2006 | Jabri et al. | |
| 2006/0161635 A1 | 7/2006 | Lamkin et al. | |
| 2006/0176877 A1 | 8/2006 | Jabri et al. | |
| 2007/0005727 A1 | 1/2007 | Edwards et al. | |
| 2007/0011277 A1 | 1/2007 | Neff et al. | |
| 2007/0027808 A1 | 2/2007 | Dooley et al. | |
| 2007/0049333 A1 | 3/2007 | Jeong et al. | |
| 2007/0076711 A1 | 4/2007 | Shuster | |
| 2007/0076756 A1 | 4/2007 | Chan et al. | |
| 2007/0093275 A1 | 4/2007 | Bloebaum et al. | |
| 2007/0112935 A1 | 5/2007 | Espelien | |
| 2007/0116036 A1 | 5/2007 | Moore | |
| 2007/0130210 A1 | 6/2007 | Park | |
| 2007/0143806 A1 | 6/2007 | Pan | |
| 2007/0156770 A1 | 7/2007 | Espelien | |
| 2007/0162571 A1 | 7/2007 | Gupta et al. | |
| 2007/0180133 A1 | 8/2007 | Vedantham et al. | |
| 2007/0186003 A1 | 8/2007 | Foster et al. | |
| 2007/0189275 A1 | 8/2007 | Neff | |
| 2007/0226315 A1 | 9/2007 | Espelien | |
| 2007/0233701 A1 | 10/2007 | Sherwood et al. | |
| 2007/0245399 A1 | 10/2007 | Espelien | |
| 2007/0266047 A1 | 11/2007 | Cortes et al. | |
| 2007/0276864 A1 | 11/2007 | Espelien | |
| 2007/0288478 A1 | 12/2007 | Dimaria et al. | |
| 2007/0297352 A1 | 12/2007 | Jabri et al. | |
| 2007/0297427 A1 | 12/2007 | Cho et al. | |
| 2008/0021952 A1 | 1/2008 | Molinie et al. | |
| 2008/0027808 A1 | 1/2008 | Wilf | |
| 2008/0034029 A1 | 2/2008 | Fang et al. | |
| 2008/0037489 A1 | 2/2008 | Yitiz et al. | |
| 2008/0039967 A1 | 2/2008 | Sherwood et al. | |
| 2008/0090590 A1 | 4/2008 | Espelien | |
| 2008/0154696 A1 | 6/2008 | Spiegelman et al. | |
| 2009/0052380 A1 | 2/2009 | Espelien | |
| 2009/0070344 A1 | 3/2009 | Espelien | |
| 2009/0083803 A1 | 3/2009 | Al-Shaykh et al. | |
| 2009/0156182 A1 | 6/2009 | Jenkins et al. | |
| 2009/0157680 A1 | 6/2009 | Crossley et al. | |
| 2010/0017529 A1 * | 1/2010 | Takacs et al. | 709/231 |
| 2010/0023525 A1 * | 1/2010 | Westerlund et al. | 707/10 |

OTHER PUBLICATIONS

PCT Search Report May 5, 2009, PacketVideo Corp.

* cited by examiner

FIG.3

| P | ATOM ID (4cc), INDENTED TO SHOW POSITION IN HIERARCHY | ATOM NAME |
|---|---|---|
| 0 | moov | MOVIE |
| 1 | mvhd | MOVIE HEADER |
| 1 | trak | VIDEO TRACK |
| 2 | tkhd | TRACK HEADER |
| 2 | mdia | MEDIA |
| 3 | mdhd | MEDIA HEADER |
| 3 | hdlr | HANDLER |
| 3 | minf | MEDIA INFORMATION |
| 4 | vmhd | VIDEO MEDIA HEADER |
| 4 | dinf | DATA INFORMATION |
| 5 | dref | DATA REFERENCE |
| 6 | url | DATA ENTRY URL |
| 4 | stbl | SAMPLE TABLE |
| 5 | stsd | SAMPLE DESCRIPTION |
| 6 | avc1 | ANONYMOUS: AVC1 |
| 5 | stts | DECODING TIME TO SAMPLE |
| 5 | stsc | SAMPLE TO CHUNK |
| 5 | stsz | SAMPLE SIZE |
| 5 | stco | CHUNK OFFSET |
| 5 | stss | SYNC SAMPLE |
| 1 | trak | AUDIO TRACK |
| 2 | tkhd | TRACK HEADER |
| 2 | mdia | MEDIA |
| 3 | mdhd | MEDIA HEADER |
| 3 | hdlr | HANDLER |
| 3 | minf | MEDIA INFORMATION |
| 4 | smhd | SOUND MEDIA HEADER |
| 4 | dinf | DATA INFORMATION |
| 5 | dref | DATA REFERENCE |
| 6 | url | DATA ENTRY URL |
| 4 | stbl | SAMPLE TABLE |
| 5 | stsd | SAMPLE DESCRIPTION |
| 6 | mp4a | AUDIO SAMPLE ENTRY |
| 7 | esds | EL. STREAM DESCRIPTOR |
| 5 | stts | DECODING TIME TO SAMPLE |
| 5 | stsc | SAMPLE TO CHUNK |
| 5 | stsz | SAMPLE SIZE |
| 5 | stco | CHUNK OFFSET |

FIG.5

SYSTEM AND METHOD FOR REFORMATTING DIGITAL BROADCAST MULTIMEDIA FOR A MOBILE DEVICE

This application claims the benefit of U.S. Provisional Application Ser. No. 61/069,053 filed Mar. 12, 2008.

BACKGROUND OF THE INVENTION

The present invention generally relates to a system and a method for reformatting digital broadcast multimedia for a mobile device. More specifically, the present invention relates to a system and a method for reformatting digital broadcast multimedia for a mobile device that reformats and/or repackages audiovisual content into a format that may be rendered on the mobile device without the need for additional custom software on the mobile device.

Various known devices transmit digital audiovisual signals to mobile phones and/or other portable digital receivers. Known services for providing the digital audiovisual signals deliver content over 2.5G and 3G cellular networks. Delivery over the 2.5G and 3G cellular networks is known as "unicast streaming." Unicast streaming was a "first generation" of audiovisual content delivery to mobile devices. Receiver devices connected to the 2.5G and 3G cellular networks may be, for example, a mobile phone, a PDA, a dedicated mobile television receiver or another mobile device capable of receiving and displaying a mobile broadcast signal. The technology used for unicast streaming may be standardized, such as, for example, 3GPP Packet-Switched Streaming Services or 3GPP2 Multimedia Streaming Services. The technology used for unicast streaming may be proprietary, such as, for example, Microsoft Windows Media Audio and Video codecs or Advanced Streaming Format ("ASF"). The technology used for unicast streaming may be a combination of standardized and proprietary technology.

The audiovisual content of unicast streaming generally is comprised of small files having a low bit rate. A user selects one of the files for "on-demand" delivery and/or consumption. The size and bit rate are minimized because the cellular network is limited in capacity; the cellular network is burdened each time an audiovisual file is delivered to a mobile device. Further, the network operator usually bears the cost of transmission of the audiovisual file. Still further, audiovisual content services compete with other services, such as, for example, mobile internet access, for space on the network. Therefore, unicast streaming has numerous disadvantages.

Mobile digital broadcasting technologies, such as, for example, DVB-H (Digital Video Broadcasting-Handheld), T-DMB (Digital Media Broadcasting), Qualcomm FLO technology (trademark of Qualcomm, Inc.) and ISDB-T (Integrated Services Digital Broadcasting), provide advantages over unicast streaming. Mobile digital broadcasting technology is a "second generation" of audiovisual content delivery to mobile devices. Broadcast technologies deliver audiovisual content over a common one-way broadcast resource that is distinct from the cellular network. Therefore, the cellular network is not encumbered by transmission of audiovisual content, and the cellular network may be fully utilized for other services that require interactive two-way access, such as, for example, mobile internet access. Further, any number of mobile devices may receive the common broadcast simultaneously which allows the same audiovisual content to transmit to many additional mobile devices without incurring additional network costs.

Reception of mobile broadcast content requires the mobile device to have special broadcast reception hardware. Digitally encoded audiovisual content is delivered to self-contained devices that incorporate the mobile broadcast receiver hardware, the application processor, the audio and video decoders and rendering systems, the display screen and the user interface in a single device.

Mobile broadcast service has numerous disadvantages. Mobile phone subscribers typically sign single or multi-year contracts with a mobile operator and often pay a penalty for early termination. Thus, a user cannot upgrade to a new broadcast-capable phone until the contract ends which slows the purchase of a newly launched service. Mobile phone subscribers may have other reasons to not upgrade their phones as well, such as, for example, the loss of applications, media, contacts and other customized applications on their current phone if the user subscribes to a new phone. These users may be reluctant to sign up for a broadcast service which requires an upgrade to a phone that is not compatible with their current media and other customized applications.

Furthermore, a user may prefer a particular phone design which does not support the particular mobile broadcast technology for the broadcast service to which the user desires to subscribe. Separation of the mobile phone from the broadcast receiver functionality provides the advantage of allowing the user to use the particular phone design and the particular broadcast service to which the user desires to subscribe.

Mobile broadcast technology often prohibits the user from switching broadcast services without switching phones. Thus, the user loses the original investment into a broadcast-enabled phone if the user switches broadcast services. For example, a user may sign up for a first mobile broadcast service and acquire a compatible phone. The user may later develop a preference for content offered on a second mobile broadcast service. However, switching to the second mobile broadcast service by ending the original service contract and replacing the original phone may be expensive. Therefore, mobile broadcast technology has a disadvantage of significant cost and delay in building a subscriber base for the broadcast services.

The above problems may appear to be solved by addition of an external antenna and a receiver/tuner/demodulator unit to an existing mobile device that lacks broadcast reception capabilities. However, this approach fails because many existing mobile phones do not have processing power, display resolution and/or specific audiovisual decoder elements necessary to process and display full quality audiovisual content typically carried on a mobile broadcast service.

The above problems may also appear to be solved by a broadcast receiver accessory that connects to a mobile device, receives the mobile broadcast signal and re-formats the audiovisual content to a format compatible with older mobile devices, such as, for example, mobile devices designed for use with first generation unicast streaming. However, the process for reformatting the broadcast audiovisual content for delivery to the mobile device may be difficult, particularly if the targeted mobile device is limited in the multimedia formats which the mobile device was designed to support. Such a limitation may be overcome by installing and running custom software on the mobile device. For example, the mobile device may run a custom audiovisual player which is capable of playing multimedia formats for which the mobile device did not have capabilities.

However, this solution is not available for mobile devices which do not permit the installation and use of custom software, such as, for example, an Apple iPhone and an iPod Touch (registered trademarks of Apple Computer, Inc.). Further, installation of the software on the mobile device may be difficult and/or inconvenient. Therefore, repackaging the broadcast content to be rendered on the mobile device without the need for additional custom software to be present on the mobile device is advantageous. Further, repackaging the broadcast content into a single standard "universal" format allows many mobile devices to render the broadcast content. Repackaging the broadcast content reduces or eliminates the need to exchange capabilities with the mobile device and/or provide custom adaptations for each mobile device. Such custom adaptations add to the cost and complexity of the broadcast accessory device which may be responsible for receiving and repackaging the broadcast audiovisual content.

An audiovisual content format which is typically supported on multimedia-capable mobile devices is the 3GPP File Format. Therefore, repackaging the broadcast audiovisual content to 3GPP File Format may enable "universal" delivery to multimedia-capable mobile devices. However, 3GPP File Format in its general form cannot be "streamed" to the mobile device; instead, the entire file is typically delivered to the mobile device before the rendering begins. Delivery of the entire file before rendering precludes real-time delivery of an ongoing broadcast. "3GPP Progressive Download" format is a variant of 3GPP File Format that is designed to be rendered as the file is delivered to the mobile device. Thus, reformatting the incoming mobile broadcast audiovisual content into 3GPP Progressive Download format in real time while simultaneously delivering a resulting 3GPP Progressive Download file to the mobile device for rendering is advantageous.

However, 3GPP Progressive Download format is not designed for providing a real-time open-ended broadcast signal. Many of the details about the audiovisual content must be specified in up-front metadata known as the "Movie Atom." The "Movie Atom" must be placed at the beginning of the 3GPP Progressive Download file before any of the audiovisual media. In a real-time repackaging scenario, the "Movie Atom" must be created and delivered to the mobile device before the audiovisual content is received. However, the details which are needed for creation of the "Movie Atom" are typically not known in advance and cannot be predicted due to the time-varying nature of the incoming broadcast content.

This problem is solved through the use of File Format elements known as "Movie Fragments" which allow updates to the "Movie Atom" to occur later in the file. However, until recently, the 3GPP File Format standard prohibited use of "Movie Fragments" in 3GPP files. Therefore, most mobile devices which support 3GPP Progressive Download playback do not include support for "Movie Fragments" and are incapable of rendering a file which used "Movie Fragments."

A further problem exists in that the overall data rate may be increased. More specifically, the data rate associated with the 3GPP Progressive Download format produced by the repackaging may be several times larger than an original data rate associated with the incoming audiovisual broadcast. If the increased overall data rate exceeds a data connection speed which is available for delivery of the resulting 3GPP Progressive Download file to the mobile device, the resulting 3GPP Progressive Download file may not be transmitted to the mobile device. Further, minimization of the data rate of the resulting 3GPP Progressive Download file is generally desirable.

A need, therefore, exists for a system and a method for reformatting digital broadcast multimedia for a mobile device. Further, a need exists for a system and a method for reformatting digital broadcast multimedia for a mobile device that repackage the broadcast content to be rendered on the mobile device without the need for additional custom software to be present on the device. Still further, a need exists for a system and a method for reformatting digital broadcast multimedia for a mobile device that repackage broadcast content into a single standard "universal" format. Still further, a need exists for a system and a method for reformatting digital broadcast multimedia for a mobile device that reformat incoming mobile broadcast audiovisual content into 3GPP Progressive Download format in real time while simultaneously delivering a resulting 3GPP Progressive Download file to the mobile device for rendering. Moreover, a need exists for a system and a method for reformatting digital broadcast multimedia for a mobile device that minimize the data rate of a resulting 3GPP Progressive Download file.

SUMMARY OF THE INVENTION

The present invention generally relates to a system and a method for reformatting digital broadcast multimedia for a mobile device. More specifically, the present invention relates to a system and a method for reformatting digital broadcast multimedia for a mobile device that may reformat and/or repackage audiovisual content into a format that may be rendered on the mobile device without the need for additional custom software on the mobile device. The system and the method for reformatting digital broadcast multimedia for a mobile device may reformat incoming mobile broadcast audiovisual content into 3GPP Progressive Download format in real time while simultaneously delivering a resulting 3GPP Progressive Download file to the mobile device for rendering. The system and the method for reformatting digital broadcast multimedia for a mobile device may minimize the data rate of a resulting 3GPP Progressive Download file.

To this end, in an embodiment of the present invention, a method for reformatting audio data and video data for a rendering device is provided. The method has the steps of A method for reformatting audio data and video data for a rendering device, the method comprising the steps of receiving a first signal with the audio data and the video data wherein the first signal is received by a repackaging element connected to the rendering device; generating metadata wherein the repackaging element generates the metadata based on the first signal; forming video samples of the video data; adjusting sizes of the video samples wherein the sizes of the video samples are adjusted from first video sample sizes to second video sample sizes and further wherein the second video sample sizes are different sizes than the first video sample sizes; generating groups of the video samples wherein a number of video samples located in each of the groups of the video samples is based on the metadata; forming audio samples of the audio data; generating groups of the audio samples wherein a number of the audio samples located in each of the groups of the audio samples is based on the metadata; forming a first file having the metadata, the video samples and the audio samples wherein the repackaging element forms an arrangement of the groups of the video samples and the groups of the audio samples within the first file and further wherein the arrangement is based on the metadata; and transmitting the first file from the repackaging element to the rendering device as the first file is formed wherein the metadata is transmitted to the rendering device before transmittal of the groups of the video samples and the groups of the audio samples and further wherein the metadata describes the video samples corresponding to the video data which the repackaging element has not received when the metadata is transmitted to the rendering device wherein the metadata describes the audio samples corresponding to the audio data which the repackaging element has not received when the metadata is transmitted to the rendering device and further wherein the groups of the video samples and the groups of the audio samples form segments of the first file wherein the segments are transmitted to the rendering device as the segments are formed.

In an embodiment, the method has the step of adjusting sizes of the audio samples wherein the sizes of the audio samples are adjusted from first audio sample sizes to second audio sample sizes and further wherein the second audio sample sizes are different sizes than the first audio sample sizes.

In an embodiment, the rendering device is a mobile device.

In an embodiment, the method has the step of obtaining parameters from the first signal wherein the repackaging element obtains the parameters from the first signal and further wherein the metadata is based on the parameters.

In an embodiment, the method has the step of indicating a random access point of the first file wherein the video samples have a first video sample and further wherein the repackaging element encodes the metadata to indicate that the first video sample is the random access point of the first file wherein the repackaging element encodes the metadata to indicate that video samples subsequent to the first video sample are not designated as the random access point.

In an embodiment, the method has the step of rendering the video data and the audio data on the rendering device wherein the video data and the audio data are rendered using the video samples and the audio samples provided by the first file.

In an embodiment, the first file is a 3GPP Progressive Download file.

In an embodiment, the method has the step of terminating transmittal of the first file to the rendering device wherein the transmittal is terminated if a size of the first file exceeds a threshold associated with the first signal.

In an embodiment, the method has the step of using the metadata to establish the second audio frame sizes and the second video frame sizes wherein the second audio frame sizes and the second video frame sizes are based on the first signal.

In an embodiment, the method has the step of generating an audio sample buffer from the audio data of the first signal wherein the audio samples are portions of the audio sample buffer.

In an embodiment, the method has the step of generating a second file based on a second signal wherein the repackaging element receives the second signal and further wherein the repackaging element generates the second file in response to user input on the rendering device.

In another embodiment of the present invention, a system for reformatting multimedia data for a rendering device is provided. The system has a transcoder that receives a signal having the multimedia data wherein parameters are associated with the signal; a repackaging element connected to the transcoder and the rendering device wherein the repackaging element generates metadata based on the parameters and further wherein the transcoder transmits audio samples and video samples to the repackaging element wherein the audio samples and the video samples are based on the multimedia data and further wherein sizes of the audio samples and the video samples correspond to target sample sizes; and a file having the metadata, the audio samples and the video samples wherein the metadata is located in the file in a position that precedes the audio samples and the video samples and further wherein the repackaging element generates the file wherein the repackaging element transmits the file to the rendering device during formation of the file wherein the metadata has a description of the audio samples that have not been received by the repackaging element when the metadata is transmitted to the rendering device and further wherein the metadata has a description of the video samples that have not been received by the repackaging element when the metadata is transmitted to the rendering device.

In an embodiment, the system has a control element connected to the repackaging element and the transcoder wherein the control element directs the transcoder to generate the audio samples and the video samples to have the sizes that correspond to the target sample sizes.

In an embodiment, at least one of the target sample sizes is based on a largest expected sample size.

In an embodiment, the file is a 3GPP Progressive Download file.

In another embodiment of the present invention, a method for reformatting video data for a rendering device is provided. The method has the steps of receiving a signal with the video data wherein the signal is received by a transcoder; generating video samples of the video data wherein the transcoder generates the video samples and further wherein the video samples are associated with frame types wherein each of the video samples is associated with one of the frame types and further wherein each of the video samples is associated with a target size wherein the transcoder generates each of the video samples to have a size substantially similar to the target size associated with the video sample; arranging the video samples in a pattern based on the frame type associated with each of the video samples wherein the transcoder arranges the video samples; generating metadata wherein a repackaging element connected to the transcoder generates the metadata and further wherein the metadata describes the pattern and the target sizes; adjusting the size of a selected video sample to a new value wherein the repackaging element adjusts the size of the selected video sample and further wherein the new value is based on the target size associated with the selected video sample; forming a file having the video samples in the pattern wherein the repackaging element forms the file and further wherein the metadata is located in the file at a position that precedes the video samples; and transmitting the file from the repackaging element to the rendering device during formation of the file wherein the metadata describes the video samples which have not been received by the repackaging element when the metadata is transmitted to the rendering device and further wherein the video samples are transmitted to the rendering device as the video samples are added to the file.

In an embodiment, the method has the step of forming audio samples that correspond to audio data wherein the signal provides the audio data and further wherein the repackaging element inserts the audio samples into the file.

In an embodiment, the method has the step of arranging the video samples in groups of video samples wherein the pattern is formed by the groups of video samples and further wherein the frame type of the video sample located at a position in the group is the same frame type for each of the groups. In an embodiment, the method has the step of arranging the video samples in groups of video samples wherein the pattern is formed by the groups of video samples and further wherein the target size of the video sample located at a position in the group is the same target size for each of the groups.

In an embodiment, the method has the steps of detecting a scene transition in the video data wherein the transcoder detects the scene transition; identifying a first prediction source frame which occurs before the scene transition in display order wherein identification of the first prediction source frame is based on the pattern; identifying a second prediction source frame which occurs after the scene transition in display order wherein identification of the second prediction source is based on the pattern; and encoding frames which occur between the scene transition and the second prediction source frame in display order wherein the transcoder encodes the frames using motion prediction primarily based on the second prediction source frame.

It is, therefore, an advantage of the present invention to provide a system and a method for reformatting digital broadcast multimedia for a mobile device.

Another advantage of the present invention is to provide a system and a method for reformatting digital broadcast multimedia for a mobile device that reformat and/or repackage audiovisual content into a format that may be rendered on the mobile device without the need for additional custom software on the mobile device.

And, another advantage of the present invention is to provide a system and a method for reformatting digital broadcast multimedia for a mobile device that reformats the broadcast content into a single standard "universal" format.

Yet another advantage of the present invention is to provide a system and a method for reformatting digital broadcast multimedia for a mobile device that reformat incoming mobile broadcast audiovisual content into 3GPP Progressive Download format in real time while simultaneously delivering a resulting 3GPP Progressive Download file to the mobile device for rendering.

Still further, an advantage of the present invention is to provide a system and a method for reformatting digital broadcast multimedia for a mobile device that minimize the data rate of a resulting 3GPP Progressive Download file.

Yet another advantage of the present invention is to provide a system and a method for reformatting digital broadcast multimedia for a mobile device that utilize a standard data connection to provide mobile broadcast reception capability to a mobile device.

Still further, an advantage of the present invention is to provide a system and a method for reformatting digital broadcast multimedia for a mobile device by means of a mobile broadcast accessory.

Still further, an advantage of the present invention is to provide a system and a method for reformatting digital broadcast multimedia for a mobile device that allow a user to have a mobile broadcast service separate from a mobile phone service.

Moreover, an advantage of the present invention is to provide a system and a method for reformatting digital broadcast multimedia for a mobile device that supports multiple broadcast subscriptions.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a system and a method for reformatting digital broadcast multimedia for a mobile device. More specifically, the present invention relates to a system and a method for reformatting digital broadcast multimedia for a mobile device that may reformat and/or repackage audiovisual content into a format that may be rendered on the mobile device without the need for additional custom software on the mobile device. The system and the method for reformatting digital broadcast multimedia for a mobile device may reformat incoming mobile broadcast audiovisual content into 3GPP Progressive Download format in real time while simultaneously delivering a resulting 3GPP Progressive Download file to the mobile device for rendering. The system and the method for reformatting digital broadcast multimedia for a mobile device may minimize the data rate of a resulting 3GPP Progressive Download file.

Figure 1:
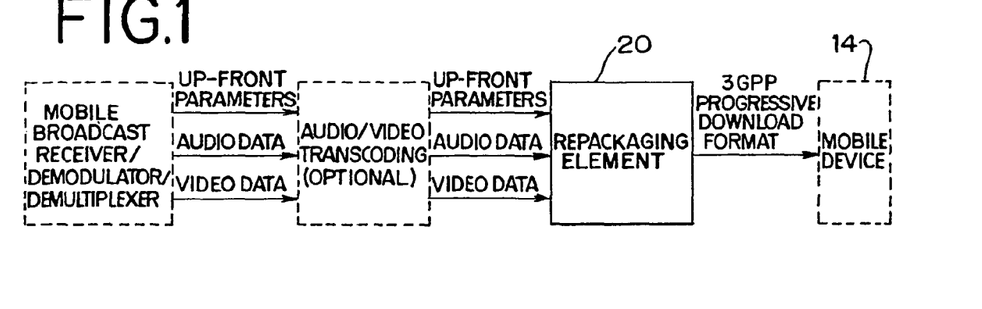
FIG. 1 illustrates a system for reformatting broadcast multimedia for a mobile device in an embodiment of the present invention.

Referring now to the drawings wherein like numerals refer to like parts, FIG. 1 illustrates a system 10 which may have a mobile device 14. A repackaging element 20 may be in communication and/or have a connection with the mobile device 14. The mobile device 14 may be, for example, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver, a portable digital audio player, a portable digital video player and/or the like. The mobile device 14 may be any device that has the capability to display video but may not have the capability to receive a specific mobile broadcast service. For example, the mobile device 14 may not have an antenna, receiver hardware, a demodulator and/or a tuner that may be necessary to receive and/or to utilize a broadcast signal. Therefore, the mobile device 14 may not be capable of processing and/or rendering full quality audiovisual content present in the broadcast signal; for example, the mobile device 14 may not be able to decode and/or to render the full quality content and/or may not be able to display full resolution of a video portion of the audiovisual content of the broadcast signal.

The audiovisual content of the broadcast signal may be in a file in compressed digital form. For example, the audiovisual content may be in the following audio formats: AMR, AMR-WB, MP3, AAC, AAC+ and/or Enhanced aacPlus;

and/or in the following video formats: H.263, MPEG-2 video, MPEG-4 Part 2 Visual and/or MPEG-4 Part 10 Visual (also known as H.264). The repackaging element 20 may receive audio data and/or video data and may reformat incoming audio data and/or incoming video data from an original broadcast format into a second format that may be rendered on the mobile device 14. The second format may match known decoding and/or rendering capabilities of the mobile device 14. The second format may be 3GPP Progressive Download Format and/or the repackaging element 20 may reformat the audiovisual content by creating a 3GPP Progressive Download Format file. The repackaging element 20 may also receive "Up-Front" parameters of the audiovisual content of the broadcast signal as described in further detail below.

Figure 2:
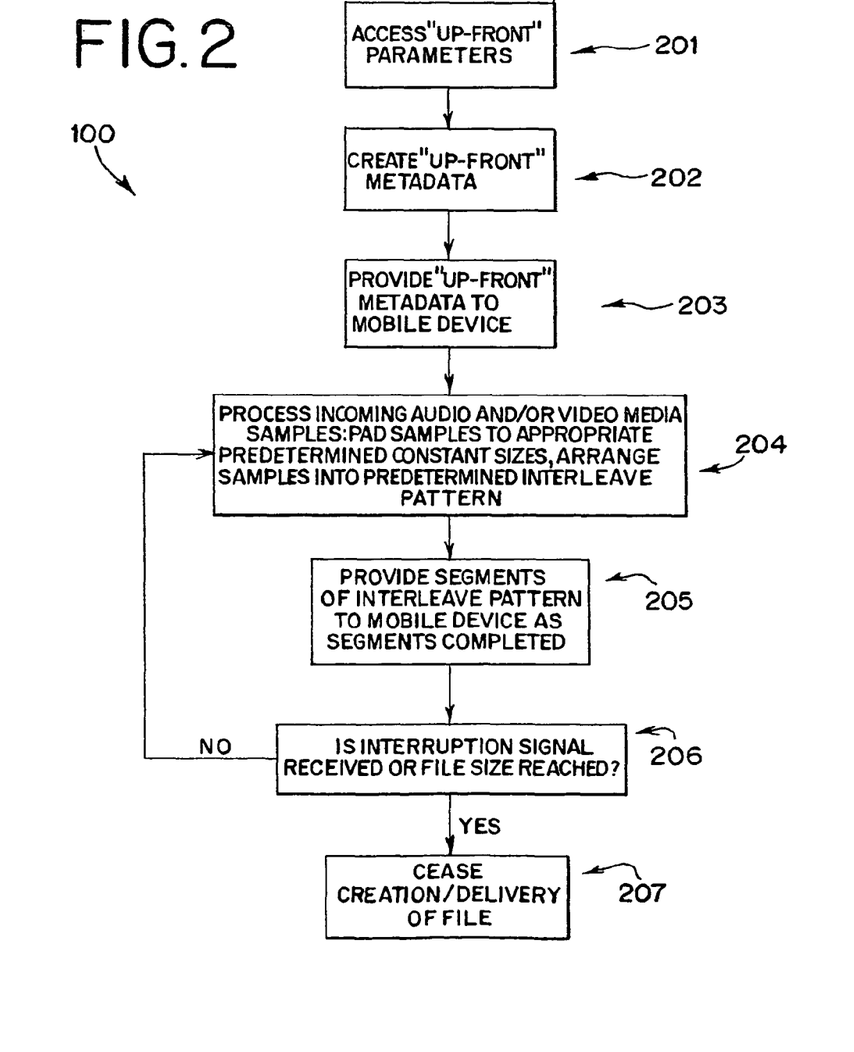
FIG. 2 illustrates a flowchart of a method for reformatting broadcast multimedia for a mobile device in an embodiment of the present invention.

FIG. 2 generally illustrates a method 100 for reformatting digital broadcast multimedia for the mobile device 14. The repackaging element 20 may access the "Up-Front" parameters associated with the audiovisual content of the broadcast signal as generally shown at step 201. The repackaging element 20 may access the "Up-Front" parameters when a user selects a broadcast service for viewing. The "Up-Front" parameters may be specific to a particular broadcast channel within the broadcast service, in which case the "Up-Front" parameters may be available to the repackaging element 20 when the user of the mobile device 14 selects the broadcast channel for viewing. Thus, the "Up-Front" parameters may be available at a start of the transformation process. Based on the "Up-Front" parameters associated with the audiovisual content of the broadcast signal, the repackaging element 20 may create "Up-Front" metadata as generally shown at step 202. The metadata may precede audio data and/or video data in a file created by the repackaging element 20. For 3GPP Progressive Download format, the "Up-Front" metadata may have a file type "atom" (specifically, "ftyp"). The "Up-Front" metadata may have a "movie atom" (specifically, "moov"). The movie atom may have metadata describing the audio data and/or the video data which may be located in the file. A location of the metadata in the file may precede a location of the audio data and/or the video data. As discussed below, the repackaging element 20 may generate the "Up-Front" metadata before the audio data and/or the video data are available.

The "Up-Front" parameters associated with the audiovisual content of the broadcast signal may have a "fileDuration" parameter that may indicate an intended duration of the file, such as, for example, two hours. The "Up-Front" parameters may also have a "videoPeriod" parameter that may indicate a time difference between adjacent video frames. The "Up-Front" parameters may also have an "audioPeriod" parameter that may indicate a time difference between adjacent audio frames. The "videoPeriod" parameter and/or the "audioPeriod" parameter may be a constant value for typical broadcast services. For example, the "videoPeriod" parameter may be 1/30th of a second or 1/15th of a second, and/or the "audioPeriod" parameter may be 20 milliseconds or 30 milliseconds. The "Up-Front" parameters may also have a "videoSampleSize" parameter. The "videoSampleSize" parameter may be a constant size to use for video samples in the file. The "Up-Front" parameters may also have an "audioSampleSize" parameter. The "audioSampleSize" parameter may be a constant size to use for audio samples in the file. The "videoSampleSize" parameter and/or the "audioSampleSize" parameter may be expressed in bytes.

A size of a largest expected video frame in a digitally compressed domain may be expressed in bytes. The "videoSampleSize" parameter may be established as a value that may be larger than the size of the largest expected video frame. Video samples which may have a size smaller than the size of the largest expected video frame may be padded to the size of the largest expected video frame as described in further detail below.

A size of a largest expected audio frame in a digitally compressed domain may be expressed in bytes. The "audioSampleSize" parameter may be established as a value that may be larger than the size of the largest expected audio frame. Audio samples which may have a size smaller than the size of the largest expected audio frame may be padded to the size of the largest expected audio frame as described in further detail below.

The "videoSampleSize" parameter and/or the "audioSampleSize" parameter may be determined for a particular audio/video source, such as, for example, a particular mobile broadcast service and/or a particular channel within the particular mobile broadcast service. The "videoSampleSize" parameter and/or the "audioSampleSize" parameter may be determined in advance and/or may be based on known parameters of the broadcast and/or lab observations of the broadcast signal. Alternatively, the repackaging element 20 may observe the incoming audio data and/or the video data in real-time. Thus, the repackaging element 20 may receive and/or may adjust the "videoSampleSize" parameter and/or the "audioSampleSize" parameter based on the size of observed audio samples and/or video samples.

The "Up-Front" parameters may also have a "videoWidth" parameter that may indicate a width of video content of the broadcast signal, and/or a "videoHeight" parameter that may indicate a height of the video content of the broadcast signal. The "videoWidth" parameter and/or the "videoHeight" parameter may be expressed in pixels.

The "Up-Front" parameters may also have an "audioConfig" parameter that may indicate audio configuration information. The audio configuration information may be known at initiation of the reformatting process. The audio configuration information may be stored in an appropriate segment of the 3GPP Progressive Download file as may be required by the 3GPP Progressive Download standard. The "Up-Front" parameters may also have a "videoConfig" parameter that may indicate video configuration information which may be known at the initiation of the transformation process and/or which may be stored in an appropriate segment of the 3GPP Progressive Download file as may be required by the 3GPP Progressive Download standard.

Based on the "Up-Front" parameters, the repackaging element 20 may create the "Up-Front" metadata of the 3GPP Progressive Download file. For example, the "Up-Front" metadata may include the file type atom, "ftyp," and/or the "Movie Atom," "moov." The file type atom may be fixed and/or may not depend on the "Up-Front" parameters. The file type atom may have at least one brand which may indicate 3GPP Progressive Download format, such as, for example, "3gr6" or "3gr7". The file type atom may have additional brands, such as, for example, "3gp4," "3gp5," "3gp6," "isom" and/or "mp41." The "Movie Atom" may have a "Movie Header" atom, such as, for example, "mvhd," and/or individual "Track" atoms, such as, for example, "trak," for audio and/or video. Each of the individual "Track" atoms may have a sub-hierarchy of other atoms which may give information about media data associated with each "Track" atom.

Figure 3:
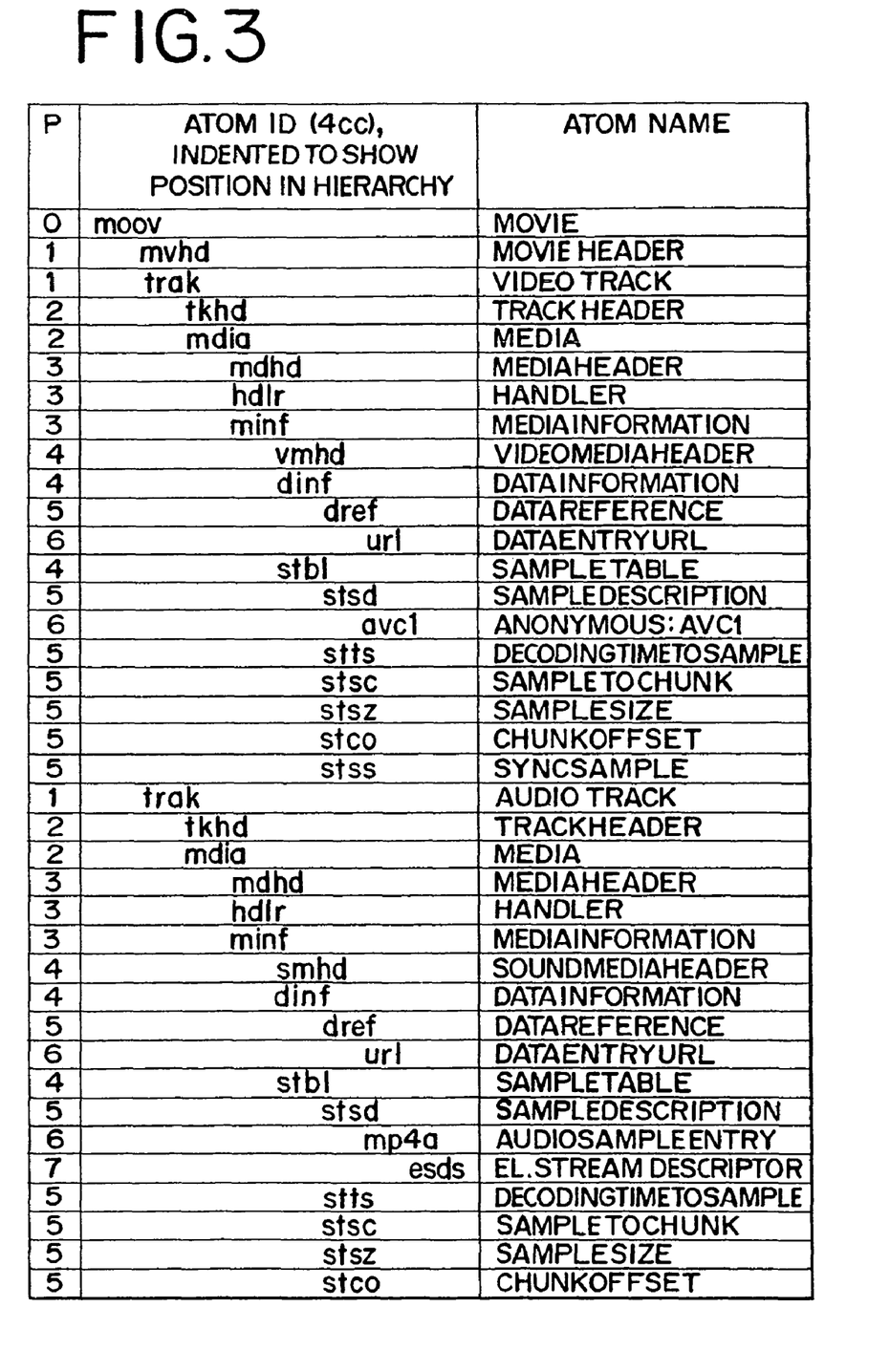
FIG. 3 illustrates a table of metadata for reformatting broadcast multimedia for a mobile device in an embodiment of the present invention.

The table illustrated in FIG. 3 provides a structure for the "Movie Atom" in a 3GPP Progressive Download file created by an embodiment of the current invention. The structure for the "Movie Atom" may be dictated by the 3GPP File Format standard. Other variations on the structure for the "Movie Atom," such as, for example, atoms occurring in different orders, or variations of which atoms are present or absent, may be apparent to one skilled in the art. A file containing an audio track or a video track but not both is another example of a variation that may be apparent to one skilled in the art. Differences in atom contents due to different audio codecs and/or video codecs is yet another example of a variation that may be apparent to one skilled in the art. The structure for the "Movie Atom" should not be limited to a specific embodiment.

The repackaging element 20 may generate contents of each sub-atom within the "Movie Atom" to be consistent with the "Up-Front" Parameters. As discussed previously, the "Up-Front" Parameters may be available to the repackaging element 20 at the initiation of the transformation process. For example, a "File Duration" sub-atom may be located in an "mvhd" atom and/or may be a number that is equal to the "fileDuration" parameter. "Track Duration" sub-atoms may be located in a "tkhd" atom and/or a "mdhd" atom and/or may be based on the largest multiple of the "audioSampleSize" parameter and/or the "videoSampleSize" parameter which is less than the "fileDuration" parameter. As yet another example, a "Video Resolution" sub-atom may be present in a "tkhd" atom and/or a "avc1" atom and/or may be calculated based on the "videoWidth" parameter and/or the "videoHeight" parameter. In another example, an audio decoder configuration and/or a video decoder configuration may be located in a sub-atom of a "stsd" atom. The audio decoder configuration and/or the video decoder configuration may be determined based on the "audioConfig" parameter and/or the "videoConfig" parameter.

Atom contents which are not dependent on a specific audiovisual session may be determined before initiation of the audiovisual session. Therefore, the atom contents which are not dependent on the specific audiovisual session may be treated as constant by the repackaging element 20 when the "Movie Atom" is generated. Examples of the atom contents which may not be dependent on the specific audiovisual session may be atom version fields, reserved fields, fields with constant values defined in the 3GPP File Format specification or related standard specifications, time scale parameters used at the file and/or track levels and/or various other parameters that may be apparent to one skilled in the art.

Detailed descriptions of audio media samples and/or video media samples in the file must be encoded in the sub-atoms under a Sample Table atom ("stbl") as may be required by the 3GPP File Format specification and/or related standard specifications. As generally illustrated in FIG. 3, the detailed descriptions of the audio media samples and/or the video media samples have the size of each sample ("stsz"), an arrangement of the samples into "Chunks" ("stsc"), a byte offset which may indicate a location of each "Chunk" of samples within the file ("stco"), a decoding time of each sample ("stts"), a composition time of each sample ("ctts") and/or a list of samples which may provide random access points within the file ("stss"). The detailed information may not be available until after the audio media samples and/or the video media samples are available.

Therefore, the detailed information is generated as follows. The size of each sample may be assumed to be constant and/or equal to the "audioSampleSize" parameter and/or the "videoSampleSize" parameter for audio tracks and/or video tracks, respectively. When the audio media samples and/or the video media samples are added to the file, the audio media samples and/or the video media samples may be padded to the constant sizes using padding methods to be described below.

The audio media samples and/or the video media samples may be arranged into "Chunks" based on a predetermined number of samples per "Chunk." If a total number of samples is not divisible by the predetermined number of samples per "Chunk," then a final "Chunk" may be created to hold remaining samples. For example, a video track with 900 video frames may be arranged into 112 "Chunks" of eight video frames per "Chunk," plus one remainder "Chunk" containing the last four video frames. A specific number of samples expected in the file may be based on the "Up-Front" parameters, such as, for example, the "fileDuration" parameter, the "audioPeriod" parameter and/or the "videoPeriod" parameter. The video data may be arranged in a pre-determined audio/video interleave pattern which may consistent with the 3GPP Progressive Download standard requirements. The pre-determined audio/video interleave pattern may have a one-second interleave depth which may be required according to the 3GPP Progressive Download specification. The pre-determined audio/video interleave pattern may be established when the "Up-Front" metadata is generated by the repackaging element 20. The pre-determined audio/video interleave pattern may be created based on the known sample sizes which may be determined from the "audioSampleSize" parameter and/or the "videoSampleSize" parameter. The pre-determined audio/video interleave pattern may be created based on the pre-determined arrangement of samples into "Chunks." The pre-determined interleave pattern may be created based on the known sample timing information which may be determined from the "audioPeriod" parameter and/or the "videoPeriod" parameter. Techniques to generate a suitable audio/video interleave pattern based on sample sizes, arrangement of samples into "Chunks" and/or timing information are well known in the art, and such techniques may be employed to generate a compliant 3GPP Progressive Download file. The current invention is not limited to a specific method for generating the pre-determined audio/video interleave pattern.

The decoding time and/or the composition time of each sample may follow a constant, known pattern for a specific channel of a specific broadcast service. For example, a typical broadcast service might use a constant video frame rate with no bi-directionally coded frames. For this example, the decoding times of the video samples are equal to the composition times of the video samples. The decoding times and/or the composition times may be computed from the "videoPeriod" parameter which is an "Up-Front" parameter. If the decoding times are equal to the composition times, the composition-time-to-sample("ctts") may not need to be explicitly provided, as specified in the 3GPP File Format standard specification and/or the related standard specifications.

A list of samples which may be random access ("sync") points may be generated differently for the audio samples than for the video samples. For audio tracks, typically, every sample is a random access point. Therefore, the list of random access points is usually not provided for the audio track. For video tracks, the random access points, such as, for example, "I-Frames" or "IDR Frames," depending on the video codec employed, are typically not known in advance. For video tracks, the random access points may vary based on the video content in a way which may not be predicted at the time the "Movie Atom" is generated. If the random access points may vary, the repackaging element 20 may specify in the "Up-Front" metadata that the first video sample is a random access point. The repackaging element 20 may not specify any further random access points. When the repackaging element 20 begins to add the audio media samples and/or the video media samples to the file, the repackaging element 20 may discard the incoming audio and/or the incoming video data until the repackaging element 20 encounters a first random access video frame. Thus, the repackaging element 20 may ensure that a first video sample in the output 3GPP Progressive Download file will be a random access point.

Figure 4:
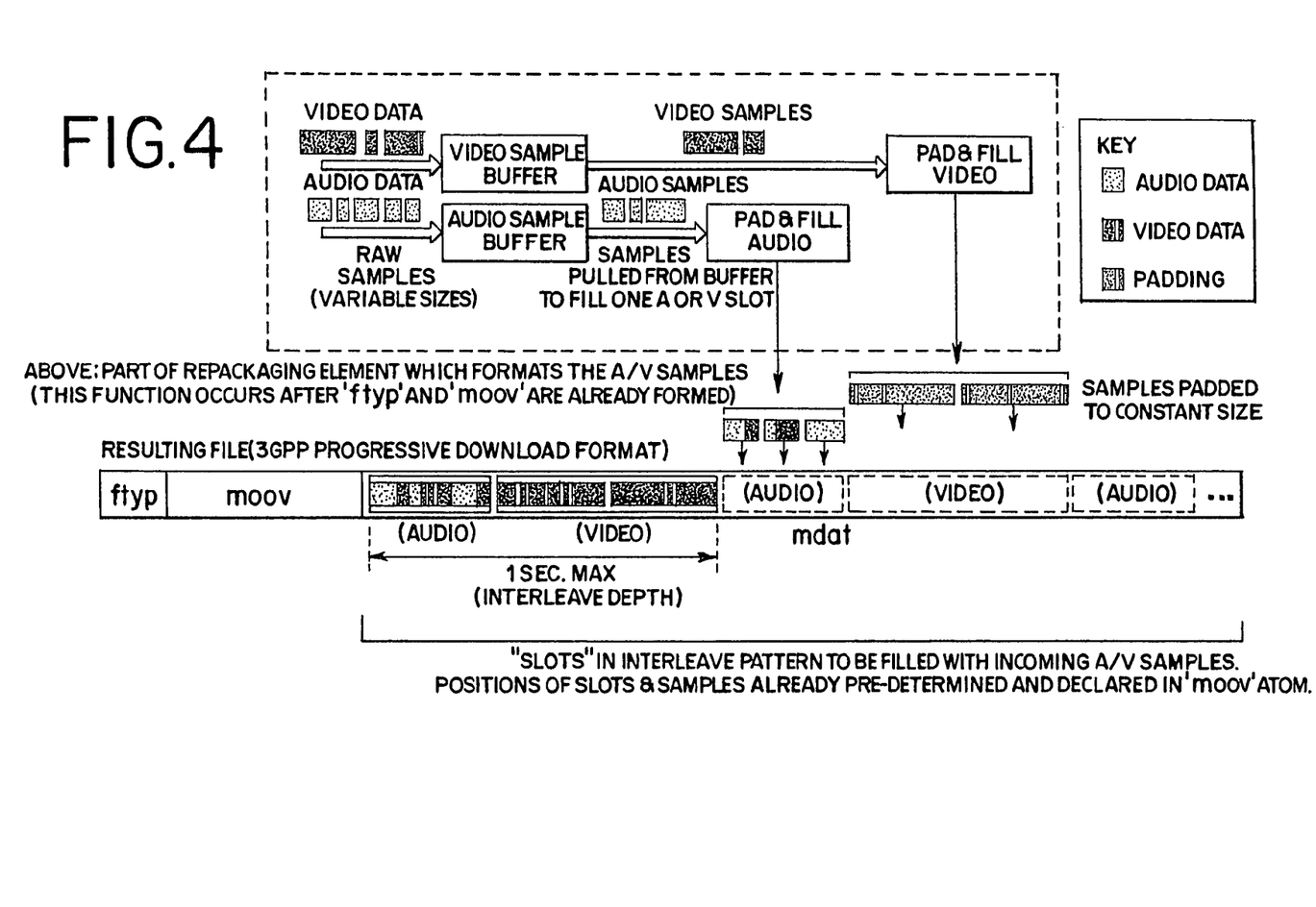
FIG. 4 illustrates a system for buffering and reformatting audiovisual samples from a multimedia broadcast for a mobile device in an embodiment of the present invention.

After generation of the "Up-Front" metadata, the "Up-Front" metadata may be made available for delivery to the mobile device 14 as generally shown at step 203 in FIG. 2. The mobile device 14 may then initiate processing and/or rendering of the file. After the repackaging element 20 provides the "Up-Front" metadata to the mobile device 14, the repackaging element 20 may process the incoming audio data and/or the incoming video data as generally shown at step 204 in FIG. 2. The repackaging element 20 may have internal storage which may be used to buffer the incoming audio data and/or the incoming video data. Buffering the incoming audio and/or the incoming video data may facilitate creation of the audio/video interleave pattern of the file as generally shown in FIG. 4. The audio/video interleave pattern of the file may be compatible with 3GPP Progressive Download format.

A one-second interleave depth may be required for compatibility with 3GPP Progressive Download format. Typically, one second each of buffer of the audio data and/or the video data may be required based on the one-second interleave depth. The incoming audio data and/or the incoming video data may be buffered in an Audio Sample Buffer and/or a Video Sample Buffer, respectively. Samples from the Audio Sample Buffer and/or the Video Sample Buffer may be removed from the Audio Sample Buffer and/or the Video Sample Buffer and may be padded to an appropriate constant size as established by the "audioSample Size" parameter and/or the "videoSample Size" parameter, respectively. The samples may then be arranged into the "Chunks" of samples according to the constant number of samples per "Chunk" established when the "Movie Atom" is generated during generation of the "Up-Front" MetaData. The "Chunks" of the audio data and/or the video data may then be arranged into the pre-determined audio/video interleave pattern encoded in the "Up-Front" metadata. As the repackaging element 20 completes segments of the audio/video interleave pattern, the segments of the audio/video interleave pattern may be made available for delivery to the mobile device 14 for processing and/or rendering as generally shown at step 205 in FIG. 2. The repackaging element 20 may make the segments of the interleaved audio/video data available to the mobile device 14 as the segments are completed.

The repackaging element 20 may generate the interleaved audio data and/or video data progressively in real time. Thus, the repackaging element 20 may be continuously buffering the audio data and/or the video data; removing the audio data and/or the video data from the Audio Sample Buffer and/or the Video Sample Buffer, respectively; padding the audio data and/or the video data to achieve constant sample sizes (a step further described below); arranging the audio data and/or the video data into a subsequent segment of the interleaved pattern of the file; and then making the subsequent segment of interleaved audio/video data available for delivery to the mobile device 14.

The padding of audio samples and/or video samples to the predetermined constant size based on the "audioSampleSize" parameter and/or the "videoSampleSize" parameter, respectively, may be performed using well known padding techniques. The well known padding techniques may be established by a coding standard specification. For example, H.264 video samples may be padded by adding an appropriately sized "Filler Data NAL Unit" after the last NAL Unit in a specific sample. As another example, H.264 video samples may be padded using the "Byte Stuffing Process" described in Section 9.3.4.6 of the H.264 Video Codec Specification in the event the optional CABAC tool is used in the underlying H.264 bitstream. As a further example, MPEG-4 video samples may be padded by adding an appropriate number of "stuffing" macroblocks at the bitstream level of the video sample. As another example, AAC audio samples may be padded by adding an appropriate number of FILL elements at the bitstream level. Still further, AMR speech samples may not require padding because, for a specific bit-rate, the AMR speech samples may initially be a constant, well-known size. Yet further, audio samples and/or video samples may be padded by adding a pattern of "garbage" bits at the start and/or end of the sample. The "garbage" bits may be chosen to not emulate start codes relevant to the particular audio codec and/or video codec. Although padding with the "garbage" bits may not be "legal" syntax for the specific coding standard, an audio decoder and/or a video decoder that encounter the "garbage" bits may be unable to process the "garbage" bits and/or may skip ahead to the next recognizable start code.

The audio samples and/or the video samples may be padded using a combination of the methods applicable to the particular audio codec and/or video codec. For example, MPEG-4 video samples may be padded using a combination of "stuffing macroblocks" at the bitstream level of the video frame and/or "garbage bits" added at the end of the sample. Other methods of padding the audio samples and/or the video samples to the predetermined size may be utilized. The current invention should not be limited to a specific method of padding and/or a specific embodiment of the audio samples and/or the video samples.

The repackaging element 20 may continue to create and/or deliver segments of the interleaved audio/video data until a file size indicated in the "Up-Front" metadata has been reached, and/or until an interruption signal is received from the mobile device 14 as generally shown at step 206 in FIG. 2. The file size indicated in the "Up-Front" metadata may correspond to the "fileDuration" parameter which may be established to reflect a period of time which may be longer than the user typically may watch continuously on the mobile device 14. For example, the file size indicated in the "Up-Front" metadata may be established so that the duration of the file may be two hours. The interruption signal received from the mobile device 14 may indicate that the user is changing channels and/or has ended viewing of the content. If the file size indicated in the "Up-Front" metadata is reached, and/or the interruption signal is received, creation and/or delivery of the file may be stopped as generally shown at step 207 in FIG. 2. If the user selects new content to watch, then creation and/or delivery of a new 3GPP Progressive Download file may be initiated.

As noted above, the "audioSampleSize" parameter and/or the "videoSampleSize" parameter may be established as values larger than the largest expected audio frame and/or the largest expected video frame, respectively. If the incoming audio sample and/or the incoming video sample is larger than the "audioSampleSize" parameter and/or the "videoSampleSize" parameter, respectively, the repackaging element 20 may truncate the incoming audio sample and/or the incoming video sample to correspond to the "audioSampleSize" parameter and/or the "videoSampleSize" parameter.

The above description addresses a situation of the broadcast signal having both audio data and video data. It will be apparent to one skilled in the art that an alternative embodiment may address a situation of the broadcast signal having only audio data or video data. The repackaging element 20 may create "Up-Front" metadata that has only the audio data and/or the video data. The repackaging element 20 may create a pre-determined pattern of samples having only the audio data and/or the video data.

As a result of the method generally shown in FIG. 2, the repackaging element 20 may generate the 3GPP Progressive Download File despite the repackaging element 20 having no control over sizes of the audio samples and/or the video samples received by the repackaging element 20. For example, the sizes of the audio samples and/or the video samples received by the repackaging element 20 may be determined entirely by the broadcast service. Alternatively, the audiovisual content of the broadcast signal may be transcoded to produce the audio samples and/or the video samples, but the transcoding may not be controllable to adjust the sizes of the audio samples and/or the video samples. Therefore, the repackaging element 20 may establish the constant sizes for the "audioSampleSize" parameter and/or the "videoSampleSize" parameter based on the largest sample sizes expected at the output of the transcoding process, and/or may pad the audio samples and/or the video samples to the constant sizes.

Due to padding of the audio samples and/or the video samples, an overall data rate associated with the 3GPP Progressive Download format produced by the repackaging element 20 may be several times larger than an original data rate associated with the incoming broadcast signal. The connection between the repackaging element 20 and the mobile device 14 may have a capacity that is less than the overall data rate associated with the 3GPP Progressive Download file produced by the repackaging. The 3GPP Progressive Download file may not be capable of real-time transmission to the mobile device 14 if the capacity of the connection is smaller than the overall data rate associated with the 3GPP Progressive Download file.

Figure 5:
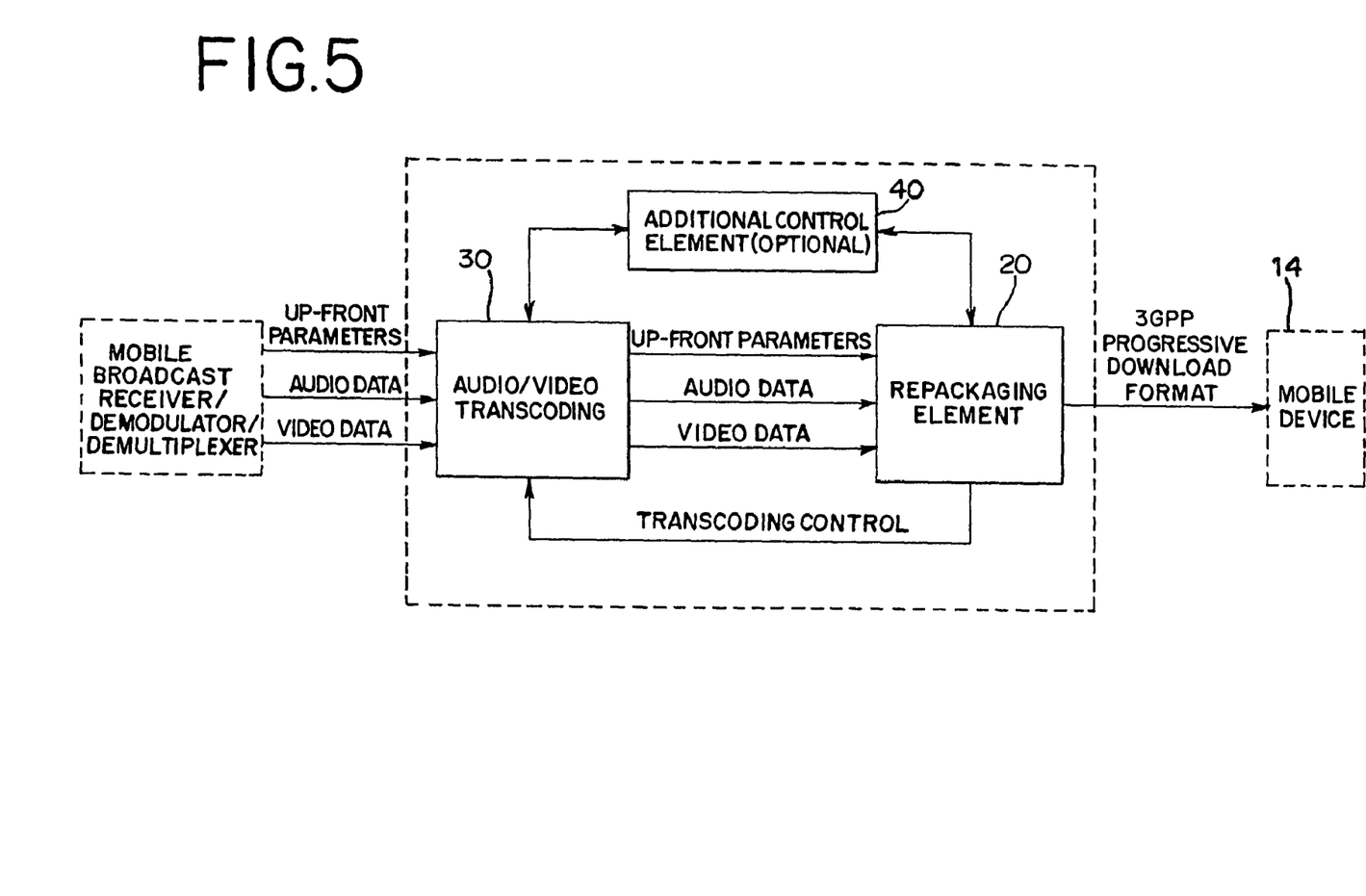
FIG. 5 illustrates a system for reformatting broadcast multimedia for a mobile device in an embodiment of the present invention.

The increased overall data rate may be addressed as generally shown in FIG. 5. A transcoding element 30 may be placed under common control with the repackaging element 20. The transcoding element 30 may produce the audio samples and/or the video samples in sizes which target the known sample sizes specified by the "Up-Front" metadata created by the repackaging element 20. Specifically, the transcoding element 30 may produce sample sizes which are as close as possible to a known target sample size without exceeding the known target sample size.

The repackaging element 20 may control the transcoding element 30. Alternatively, an additional control element 40 may control and/or may coordinate the repackaging element 20 and the transcoding element 30. Therefore, the repackaging element 20 and/or the additional control element 40 may direct the transcoding element 30 to produce audio samples and/or video samples that have a size which targets the known sample sizes specified by the "Up-Front" metadata created by the repackaging element 20. Production of the audio samples and/or the video samples which target the sizes specified by the "Up-Front" metadata may minimize an amount of padding which is added to the audio samples and/or the video samples. Further, production of the audio samples and/or the video samples which target the sizes specified by the "Up-Front" metadata may prevent a need for truncation of the audio samples and/or the video samples.

Figure 6:
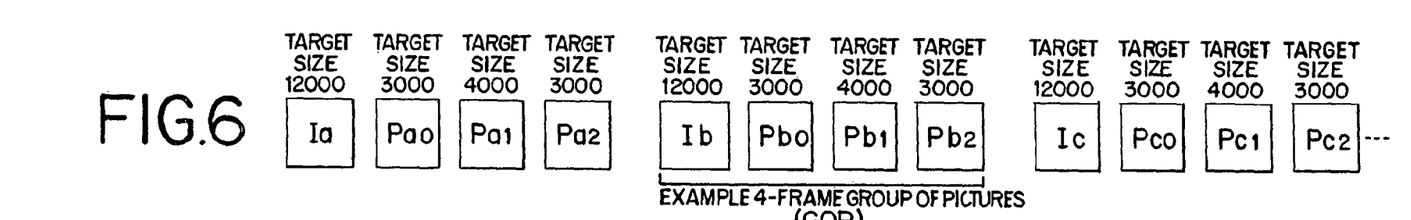
FIG. 6 illustrates a Group of Pictures ("GOP") pattern for reformatting broadcast multimedia for a mobile device in an embodiment of the present invention.

A majority of the padding of the samples may be due to the padding of the video samples because an overall data rate of video is typically several times larger than an overall data rate of audio. Further, variation in video sample sizes is typically greater than variation in audio sample sizes. As shown in FIG. 5, the transcoding element 30 may be configured by the repackaging element 20 and/or the additional control element 40 to produce output video samples according to a repeating pattern of video frame types. The repeating pattern of video frame types is known as "Group of Pictures" (hereinafter "GOP"). For example, the transcoding element 30 may be configured to produce four-frame GOPs according to the repeating pattern as illustrated in FIG. 6. The frames shown in FIG. 6 may be considered to be in "display order."

The GOP may be a group of successive pictures within an encoded video stream. For example, the encoded video stream may be encoded using H.263, MPEG-2, MPEG-4 part 2 visual, or MPEG-4 part 10 (also known as H.264). Each encoded video stream may have successive GOPs. The GOP may contain one or more intra-coded pictures ("I-frames") which may be decoded independently of other pictures in the video bitstream. The GOP may begin with an I-frame. The GOP may contain one or more predictively coded pictures ("P-frames") which may have motion-compensated difference information from a preceding "I-frame" and/or a preceding "P-frame." The GOP may contain one or more bidirectionally predicted coded pictures ("B-frames") which may have motion-compensated difference information from a preceding and/or a following I-frame and/or a preceding and/or a following P-frame. Use of GOP is well-known in the art. The present invention should not be limited to a specific GOP, GOP size and/or GOP frame pattern.

When reformatting is initiated, the transcoding element 30 may be configured to produce a specific GOP frame pattern. Each target frame in the repeating GOP pattern may be associated with a target sample size. For example, the 4-frame GOP in FIG. 6 might be associated with the following target sample sizes: I=12,000 bytes; $P_0$=3,000 bytes; $P_1$=4,000 bytes and $P_2$=3,000 bytes. The target sample sizes may be defined once for the GOP pattern, and may then be applied identically to all instances of the GOP. For the example in FIG. 6, the target size $P_1$=4,000 bytes applies to frames $P_{a1}$, $P_{b1}$, $P_{c1}$, $P_{d1}$ and so forth.

The transcoding element 30 may be configured to produce the specific GOP pattern and/or the associated target sizes. The transcoding element 30 may then control the encoding process of the transcoding element 30 so that the output video samples may match the frame types associated with the repeating GOP frame pattern. Further, the output video samples may have a size substantially equal to the target sample sizes without exceeding the target sample sizes.

The repackaging element 20 may then use the repeating GOP frame pattern and/or the associated video sample sizes to generate the "Up-Front" metadata to match a configuration of the transcoding element 30. Instead of a single constant video sample size, the repackaging element 30 may utilize a repeating pattern of known video sample sizes that are substantially equal to the target sample sizes. The repackaging element 20 may create sample size information, such as, for example, the "stsz" sub-atom, in the "Up-Front" metadata according to the repeating GOP pattern of target sample sizes. When the repackaging element 20 receives the video samples from the transcoding element 30, the repackaging element may pad the video samples to the target sample sizes before arranging the audio data and/or the video data into the pre-determined interleave pattern. Use of the repeating GOP pattern and/or the associated target sizes may minimize the amount of padding by the repackaging element 20, may reduce the overall data rate of the resulting 3GPP Progressive Download file and/or may allow the repackaging element 20 to indicate the known pattern of "I-frames" and/or the random access points in the "stss" atom when the "Up-Front" metadata is generated. Indication of the known pattern of I-frames and/or the random access points in the "stss" atom when the "Up-Front" metadata is generated may allow the mobile device 14 to provide random access to the 3GPP Progressive Download file if random access is supported by the mobile device 14.

The I-frames generated by the transcoding element 30 according to the repeating GOP frame pattern may not align with natural scene transitions in the original broadcast content. The I-frames are typically used to encode a point at which natural scene transitions may occur in the audiovisual content of the broadcast signal. An increased data rate may be needed to encode the natural scene transitions so that loss of quality may not be noticeable to a viewer. If the I-frames and/or points of increased target video sample size are pre-configured in advance, the transcoding element 30 may not be able to allocate sufficient bit rate and/or appropriate video frame type to encode the natural scene transitions. Therefore, the end viewer of the resulting 3GPP Progressive Download File may notice decreased video quality at and/or near the natural scene transitions.

Figure 7:
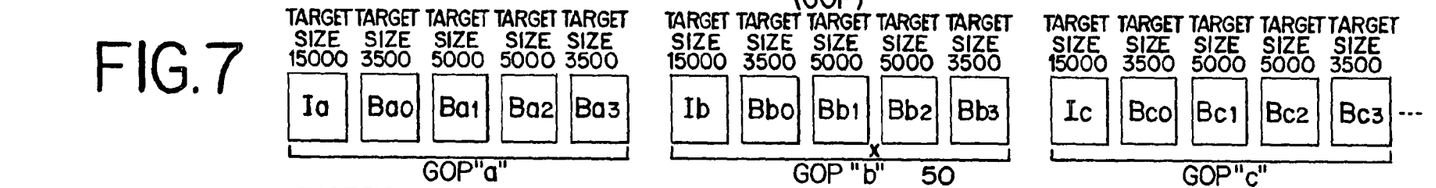
FIG. 7 illustrates a GOP pattern for reformatting broadcast multimedia for a mobile device in an embodiment of the present invention.

The transcoding element 30 may utilize "bi-directional prediction" to encode the natural scene transition points. For example, the transcoding element 30 may be configured to use a 5-frame repeating GOP pattern as generally shown in FIG. 7. Each B-Frame may be predictively encoded relative to a previous I-Frame in display order, a next I-Frame in display order and/or a combination of the previous I-Frame and the next I-frame in display order. The basic techniques for encoding B-frames are well-known and are specified in the relevant video compression standard, such as, for example, H.263 as described in Annex O of the H.263 video codec standard specification, MPEG-4 part 2 visual, and/or MPEG-4 part 10 visual (also known as H.264) Thus, for example, frame "$B_{b2}$" in FIG. 7 may be predictively encoded with a prediction based on frame "$I_b$", frame "$I_c$", or a combination of the frames "$I_b$" and "$I_c$".

The scene transition may occur at a time 50 between the display times of the frames labeled "$B_{b1}$" and "$B_{b2}$" in FIG. 7. The transcoding element 30 may detect the scene transition. A prediction process for the B-frames within GOP "b" may utilize forward prediction based on the frame "$I_b$" and/or backward prediction based on the frame "$I_c$" for each of the B-frames in GOP "b". Characteristics of content located before the scene transition may be encoded by the previous I-frame, such as, for example, frame "$I_b$" in FIG. 7. Characteristics of content after the scene transition may be encoded by the next I-frame, such as, for example, frame "$I_c$" in FIG. 7. The frame "$I_b$" and/or the frame "$I_c$" may have a larger target sample size than each of the B-frames in GOP "b". The forward prediction and/or the backward prediction utilized for the B-frames between the frame "$I_b$" and/or the frame "$I_c$" may reflect a position of the B-frame relative to the scene transition. Thus, frame "$B_{b0}$" and/or frame "$B_{b1}$", which may occur before the scene transition, may obtain most or all of the prediction from the previous I-frame "$I_b$". Further, the frame "$B_{b2}$" and/or the frame "$B_{b3}$", which may occur after the scene transition, may obtain most or all of the prediction from the next I-frame "$I_c$".

The B-frames may be coded using smaller target sample sizes because a nearby I-frame before or after the B-frame may be an effective source for temporal prediction. The B-frames which are more distant from anchoring I-frames may require a larger data rate. Therefore, a configuration of target video sample sizes for B-frames may reflect increased target sample sizes with increased distance from the I-frames. For example, the frame "$B_{b1}$" and/or the frame "$B_{b2}$" may be configured to have larger target sizes than the frame "$B_{b0}$" and/or the frame "$B_{b3}$" as generally shown in FIG. 7.

Figure 8:
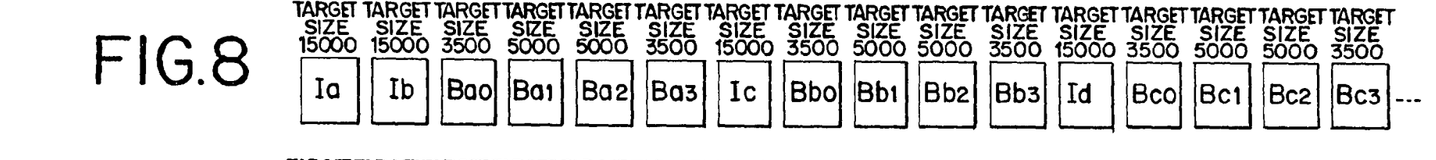
FIG. 8 illustrates a pattern of frames and associated target sizes in "decoding order" for reformatting broadcast multimedia for a mobile device in an embodiment of the present invention.

The repackaging element 20 may identify the fixed GOP frame pattern and/or the associated target video sample sizes to which the transcoding element 30 has been configured. However, the presence of B-frames in the GOP pattern may cause a reordering of compressed video samples into a decoding order for storage into the 3GPP Progressive Download file. The repackaging element 20 may identify the reordering and/or may account for the frame reordering as the repackaging element 20 reformats the incoming audio data and/or the incoming video data. The mapping between the display order and the decoding order is well-known and is typically defined in the relevant video compression standard. For example, the display order shown in FIG. 7 may result in the decoding order generally shown in FIG. 8 for the MPEG-4 Part 2 visual codec.

The encoding process of the transcoding element 30 may produce compressed video samples in decoding order. Therefore, the repackaging element 20 may expect the compressed video samples to be presented by the transcoding element 30 in decoding order. The decoding order may be the same as the order in which the video samples may normally be placed into the 3GPP Progressive Download file. Thus, the repackaging element 20 may expect the video samples and/or the associated video sample sizes to appear in the decoding order and/or may utilize the decoding order for the reformatting.

For example, the repackaging element 20 may generate the audio/video interleave pattern based on placement of the video samples into the 3GPP Progressive Download file in decoding order. Therefore, the target sample sizes may also be considered to occur in the decoding order.

As another example, the repackaging element 20 may create the "Up-Front" metadata based on placement of the video samples in the decoding order. Therefore, generation of the "stsz" atom in the video track may be based on the placement of the video samples in the decoding order. The video "Chunk" locations used to generate the "stco" atom in the video track may be based on the placement of the video samples in the decoding order. Further, the repackaging element 20 may provide both the "stts" atom and/or the "ctts" atom for the video track to provide the decoding times and/or the composition times of the video samples, respectively.

As yet another example, the repackaging element 20 may receive the video samples from the transcoding element 30 in the decoding order and/or may pad the video samples to the known target sample sizes which may also be considered to be in the decoding order. After padding, the repackaging element 20 may arrange the padded audio samples and/or the padded video samples into the pre-determined audio/video interleave pattern accordingly.

Alternatively, the transcoding element 30 may produce the video samples in the display order or in some other known order not described herein. The repackaging element may be designed to account for the order in which the transcoding element 30 may produce the video samples. The repackaging element 20 may also account for the order of the video samples which may be required by the 3GPP Progressive Download standard. The repackaging element 20 may perform reformatting based on an expected order of the samples and/or may account for any reordering which may be needed when creating the file.

As noted previously, the repackaging element may consider the remapping of video samples to the decoding order if "bi-directional prediction" is used to encode the natural scene transition points. The repackaging element 20 may account for the remapping of the video samples to the decoding order if the GOP frame pattern has B-frames and/or otherwise accommodates use of "bi-directional prediction."

The use of "bi-directional prediction" to encode the natural scene transitions may have various embodiments depending on the video codec employed and/or specific capabilities of video encoding by the transcoding element 30. A typical scenario may involve H.263 and/or MPEG-4 part 2 visual codecs that may utilize traditional B-frames. A similar process may be performed using B-frames within MPEG-4 part 10 Visual codec (also known as H.264). However, prediction techniques in H.264 may be more flexible than prediction techniques of older video codecs. Further, the mobile device 14 may not support H.264 B-frame decoding. Therefore, an embodiment of the present invention may use H.264 without B-frames.

Figure 9:
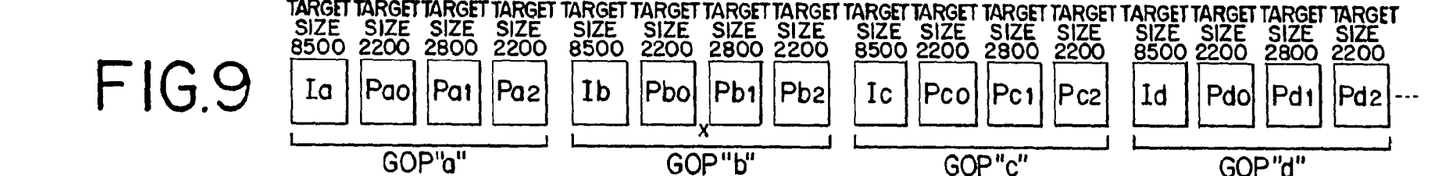
FIG. 9 illustrates a GOP pattern for reformatting broadcast multimedia for a mobile device in an embodiment of the present invention.

In H.264 video compression, an encoder may have additional flexibility to specify frame reordering for display. H.264 video compression also has the concept of Long Term Prediction frames. Thus, the encoder may specify that a particular decoded frame should be maintained in a Decoded Picture Buffer so that the particular decoded frame may be used for prediction reference for subsequent frames. The encoder may specify that a particular decoded frame should be maintained in a Decoded Picture Buffer even if the particular decoded frame is not the immediately previous reference frame which may be expected to be used as a prediction reference. A H.264 video encoding process may be configured within the transcoding element 30 such that the natural scene transitions may be encoded using a GOP frame pattern consisting of I-frames and P-frames. For example, the GOP frame pattern and target video sample sizes may be configured in the H.264 encoding process as generally shown in FIG. 9. The frame pattern in FIG. 9 is presented in "display order."

Figure 10:
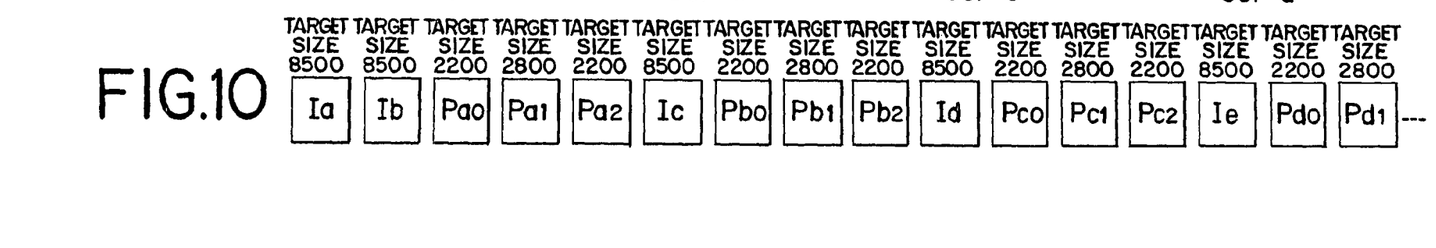
FIG. 10 illustrates a pattern of frames and associated target sizes in "decoding order" for reformatting broadcast multimedia for a mobile device in an embodiment of the present invention.

The H.264 encoding process may perform internal frame reordering such that the I-frame at the start of each GOP may be encoded before the P-frames of the previous GOP. As a result, the encoded video samples may be presented at the output of the Transcoding Element in the decoding order generally shown in FIG. 10.

Within H.264 bitstream syntax for individual frames, the H.264 encoding process may specify that, when a given P-frame is decoded, the previous two I-frames in decoding order are both located within the Decoded Picture Buffer. In addition, when the given P-frame is decoded, the H.264 encoding process may specify that the previous two I-frames in decoding order are marked as available for use as reference frames for the given P-frame. The H.264 encoding process may use management of Long-Term Reference Frames as described in the H.264 video codec standard specification. A comparison of FIGS. 9 and 10 demonstrates that the previous two I-frames in "decoding order" may be equivalent to the previous and next I-frames in "display order." Thus, forward prediction references and/or backward prediction references may be available for encoding the given P-frame.

The prediction reference for the given P-frame may have one or both of the previous two I-frames in decoding order and/or may have recently decoded P-frames which are still present in the Decoded Picture buffer. Further, the H.264 encoding process may specify a different prediction reference for each block partition in the given P-frame. An exact prediction reference and/or a combination of prediction references may be chosen by the H.264 encoding process according to techniques which are well-known in the art. Thus, the H.264 encoding process in the transcoding element 30 is able to encode scene transitions using forward prediction references and/or backward prediction references without a need to use H.264 B-frames.

The encoded H.264 video samples may be presented at the input of the repackaging element 20 in the decoding order, and the repackaging element 20 may proceed to generate the 3GPP Progressive Download file. Thus, the resulting 3GPP Progressive Download file may be delivered to and/or may be rendered by the mobile device 14 which does not support H.264 B-frames.

Configuration of the GOP frame pattern may not necessarily allow prediction of the resulting encoded frame pattern at the output of the transcoding element 30 because H.264 may allow for flexible frame reordering based on commands encoded within the H.264 bitstream. Thus, an embodiment of the present invention which may make use of the GOP frame pattern may adopt one of the following methods so that the encoded frame pattern and associated target frame sizes may be known to the repackaging element 20. The H.264 encoding process within the transcoding element 30 may have a known, constrained frame reordering algorithm such that the repackaging element 20 may predict the encoded frame pattern based on the known GOP frame pattern configuration. Alternatively, the transcoding element 30 and the repackaging element 20 may have additional communication with each other at the time the GOP frame pattern is configured such that the resulting encoded frame pattern may be established in advance and/or may be made known to the repackaging element 20.

While the presently preferred embodiments described herein focus on 3GPP Progressive Download format, it should be apparent to those skilled in the art that the described technique may be applied to produce other similar progressive download formats. For example, a 3GPP file may be arranged with "Up-Front" metadata and interleaved audio/video media samples, but may not be explicitly labeled with a 3GPP Progressive Download Brand in the "ftyp" atom. A similar arrangement may be produced using other variants of well-known file formats so that an MP4 file, a 3GPP2 file, a QuickTime (registered trademark of Apple Computer, Inc.) file, an FLV file, an ASF file and/or the like, each of which may be suitable for progressive delivery and rendering on a mobile device, such as, for example, a mobile device, may be produced.

While the presently preferred embodiments described herein focus on delivery of the resulting 3GPP Progressive Download file to a mobile device, non-mobile devices may also be capable of receiving, processing and/or rendering a 3GPP Progressive Download file or a progressive download file of similar structure. For example, desktop personal computers, gaming consoles, DLNA-equipped televisions and mobile devices and/or the like may receive, process and/or render the 3GPP Progressive Download file or the progressive download file of similar structure. It should be apparent to one skilled in the art that the present invention may be capable of delivering the transformed content to any device which is capable of receiving, processing and/or rendering the 3GPP Progressive Download file or the progressive download file of similar structure.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for reformatting audio data and video data for a rendering device, the method comprising the steps of:

receiving a first signal with the audio data and the video data wherein the first signal is received by a repackaging element connected to the rendering device;

generating metadata wherein the repackaging element generates the metadata based on the first signal;

forming video samples of the video data;

adjusting sizes of the video samples wherein the sizes of the video samples are adjusted from first video sample sizes to second video sample sizes and further wherein the second video sample sizes are different sizes than the first video sample sizes;

generating groups of the video samples wherein a number of video samples located in each of the groups of the video samples is based on the metadata;

forming audio samples of the audio data;

generating groups of the audio samples wherein a number of the audio samples located in each of the groups of the audio samples is based on the metadata;

forming a first file having the metadata, the video samples and the audio samples wherein the repackaging element forms the first file to have an arrangement of the groups of the video samples and the groups of the audio samples within the first file and further wherein the arrangement is based on the metadata; and continuously transmitting the first file from the repackaging element to the rendering device as the first file is formed by the repackaging element so that the metadata in the first file is transmitted from the repackaging element to the rendering device before transmittal of the groups of the video samples and the groups of the audio samples in the first file and further wherein the metadata in the first file describes the video samples corresponding to the video data which the repackaging element has not received when the metadata in the first file is transmitted to the rendering device wherein the metadata in the first file describes the audio samples corresponding to the audio data which the repackaging element has not received when the metadata is transmitted to the rendering device and further wherein the groups of the video samples in the first file and the groups of the audio samples in the first file form segments of the first file wherein the repackaging element transmits the first file from the repackaging element to the rendering device as the first file is formed so that the segments are transmitted to the rendering device as the segments are formed.

2. The method of claim 1 further comprising the step of:
adjusting sizes of the audio samples wherein the sizes of the audio samples are adjusted from first audio sample sizes to second audio sample sizes and further wherein the second audio sample sizes are different sizes than the first audio sample sizes.

3. The method of claim 1 wherein the rendering device is a mobile device.

4. The method of claim 3 wherein the repackaging element is provided by an accessory which is mobile, external to the mobile device, and connected to the mobile device.

5. The method of claim 1 further comprising the step of:
obtaining parameters from the first signal wherein the repackaging element obtains the parameters from the first signal and further wherein the metadata is based on the parameters.

6. The method of claim 1 further comprising the step of:
indicating a random access point of the first file wherein the video samples have a first video sample and further wherein the repackaging element encodes the metadata to indicate that the first video sample is the random access point of the first file wherein the repackaging element encodes the metadata to indicate that video samples subsequent to the first video sample are not designated as the random access point.

7. The method of claim 1 further comprising the step of:
rendering the video data and the audio data on the rendering device wherein the video data and the audio data are rendered using the video samples and the audio samples provided by the first file.

8. The method of claim 1 wherein the first file is a 3GPP Progressive Download file and further wherein 3GPP is an acronym for 3rd Generation Partnership Project.

9. The method of claim 1 further comprising the step of:
terminating transmittal of the first file to the rendering device wherein the transmittal is terminated if a size of the first file exceeds a threshold associated with the first signal.

10. The method of claim 1 wherein the metadata indicates the second video sample size for each of the video samples.

11. The method of claim 1 wherein the signal is a digital broadcast signal.

12. The method of claim 1 wherein adjusting the sizes of the video samples involves padding at least a portion of the video samples to have a predetermined size specified by the metadata.

13. The method of claim 1 wherein the metadata has a "moov" atom.

14. A system for reformatting multimedia data for a rendering device, the system comprising:
a transcoder that receives a signal having the multimedia data wherein parameters are associated with the signal;
a repackaging element connected to the transcoder and the rendering device wherein the repackaging element generates metadata based on the parameters and further wherein the transcoder transmits audio samples and video samples to the repackaging element wherein the audio samples and the video samples are based on the multimedia data and further wherein sizes of the audio samples and the video samples correspond to target sample sizes; and
a file having the metadata, the audio samples and the video samples wherein the metadata is located in the file in a position that precedes the audio samples and the video samples and further wherein the repackaging element generates the file wherein the repackaging element continuously transmits the file to the rendering device during generation of the file by the repackaging element wherein the metadata in the file has a description of the audio samples that have not been received by the repackaging element when the metadata in the file is transmitted to the rendering device and further wherein the metadata in the file has a description of the video samples that have not been received by the repackaging element when the metadata in the file is transmitted to the rendering device.

15. The system of claim 14 further comprising:
a control element connected to the repackaging element and the transcoder wherein the control element directs the transcoder to generate the audio samples and the video samples to have the sizes that correspond to the target sample sizes.

16. The system of claim 14 wherein at least one of the target sample sizes is based on a largest expected sample size.

17. The system of claim 14 wherein the file is a 3GPP Progressive Download file and further wherein 3GPP is an acronym for 3rd Generation Partnership Project.

18. The system of claim 14 wherein the rendering device is a mobile device and further wherein the repackaging element and the transcoder are provided by an accessory which is mobile, external to the mobile device, and connected to the mobile device.

19. The system of claim 14 wherein the file is a progressive download file.

20. The system of claim 14 wherein the transcoder transcodes the multimedia data to produce the audio samples and the video samples.

21. The system of claim 14 wherein the metadata has a "moov" atom.

22. A method for reformatting video data for a rendering device, the method comprising the steps of:
   receiving a signal with the video data wherein the signal is received by a transcoder;
   generating video samples of the video data wherein the transcoder generates the video samples and further wherein the video samples are associated with frame types wherein each of the video samples is associated with one of the frame types and further wherein each of the video samples is associated with a target size wherein the transcoder generates each of the video samples to have a size substantially similar to the target size associated with the video samples;
   arranging the video samples in a pattern based on the frame type associated with each of the video samples wherein the transcoder arranges the video samples in the pattern;
   generating metadata wherein a repackaging element connected to the transcoder generates the metadata and further wherein the metadata describes the pattern and the target sizes;
   transmitting the video samples generated by the transcoder and arranged in the pattern by the transcoder from the transcoder to the repackaging element;
   adjusting the size of a selected video sample to a new value wherein the repackaging element adjusts the size of the selected video sample and further wherein the new value is based on the target size associated with the selected video sample;
   forming a file having the video samples in the pattern wherein the repackaging element forms the file and further wherein the metadata is located in the file at a position that precedes the video samples; and
   transmitting the file from the repackaging element to the rendering device during formation of the file by the repackaging element wherein the metadata describes the video samples which have not been received from the transcoder by the repackaging element when the metadata is transmitted to the rendering device and further wherein the video samples are transmitted to the rendering device as the video samples are added to the file.

23. The method of claim 22 further comprising the step of:
   forming audio samples that correspond to audio data wherein the signal provides the audio data and further wherein the repackaging element inserts the audio samples into the file.

24. The method of claim 22 further comprising the step of:
   arranging the video samples in groups of video samples wherein the pattern is formed by the groups of video samples and further wherein the frame type of the video sample located at a position in the group is the same frame type for each of the groups.

25. The method of claim 22 further comprising the step of:
   arranging the video samples in groups of video samples wherein the pattern is formed by the groups of video samples and further wherein the target size of the video sample located at a position in the group is the same target size for each of the groups.

26. The method of claim 22 further comprising the steps of:
   detecting a scene transition in the video data wherein the transcoder detects the scene transition;
   identifying a first prediction source frame which occurs before the scene transition in display order wherein identification of the first prediction source frame is based on the pattern;
   identifying a second prediction source frame which occurs after the scene transition in display order wherein identification of the second prediction source frame is based on the pattern;
   encoding frames which occur between the first prediction source frame and the scene transition in display order wherein the transcoder encodes the frames which occur between the first prediction source frame and the scene transition using motion prediction primarily based on the first prediction source frame; and
   encoding frames which occur between the scene transition and the second prediction source frame in display order wherein the transcoder encodes the frames which occur between the scene transition and the second prediction source frame using motion prediction primarily based on the second prediction source frame.

27. The method of claim 22 wherein each of the frame types is one of I-frame, P-frame or B-frame.

* * * * *